No. 832,749. PATENTED OCT. 9, 1906.
C. SCHMIDT.
MOTOR TRUCK.
APPLICATION FILED DEC. 5, 1905.
2 SHEETS—SHEET 1.
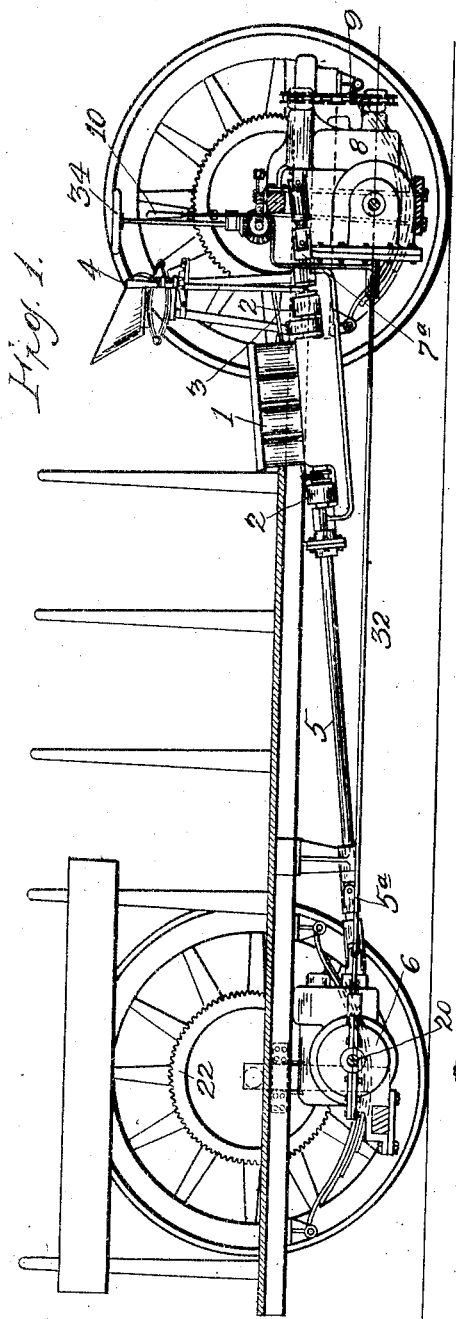
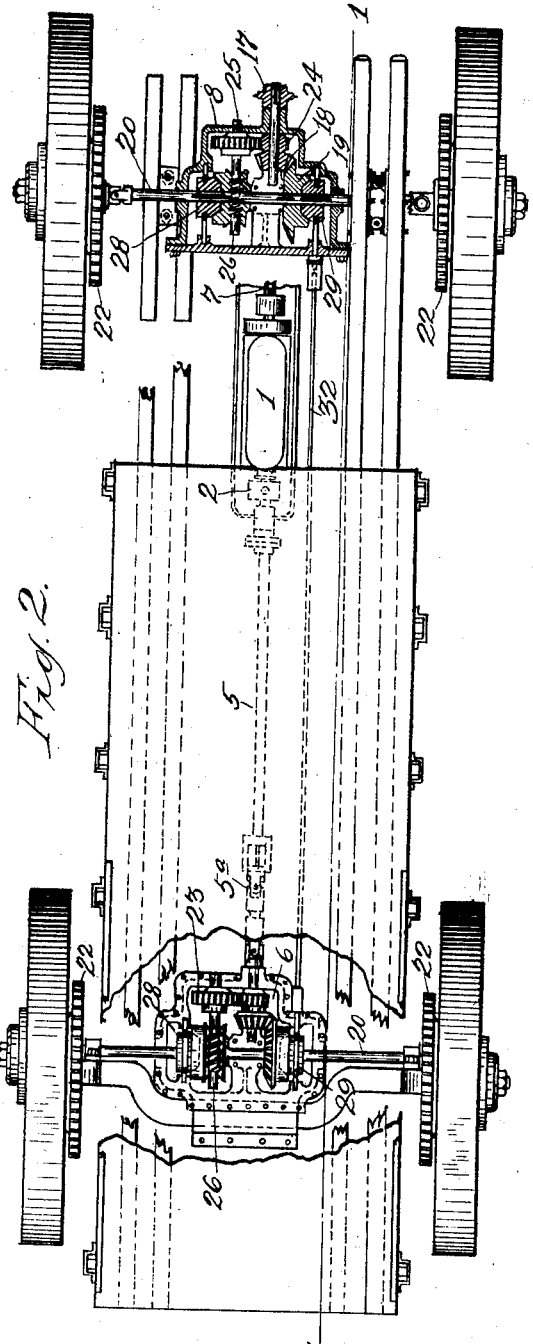
WITNESSES:
INVENTOR.
Carlos Schmidt
BY
Spear & Seely
ATTORNEYS.

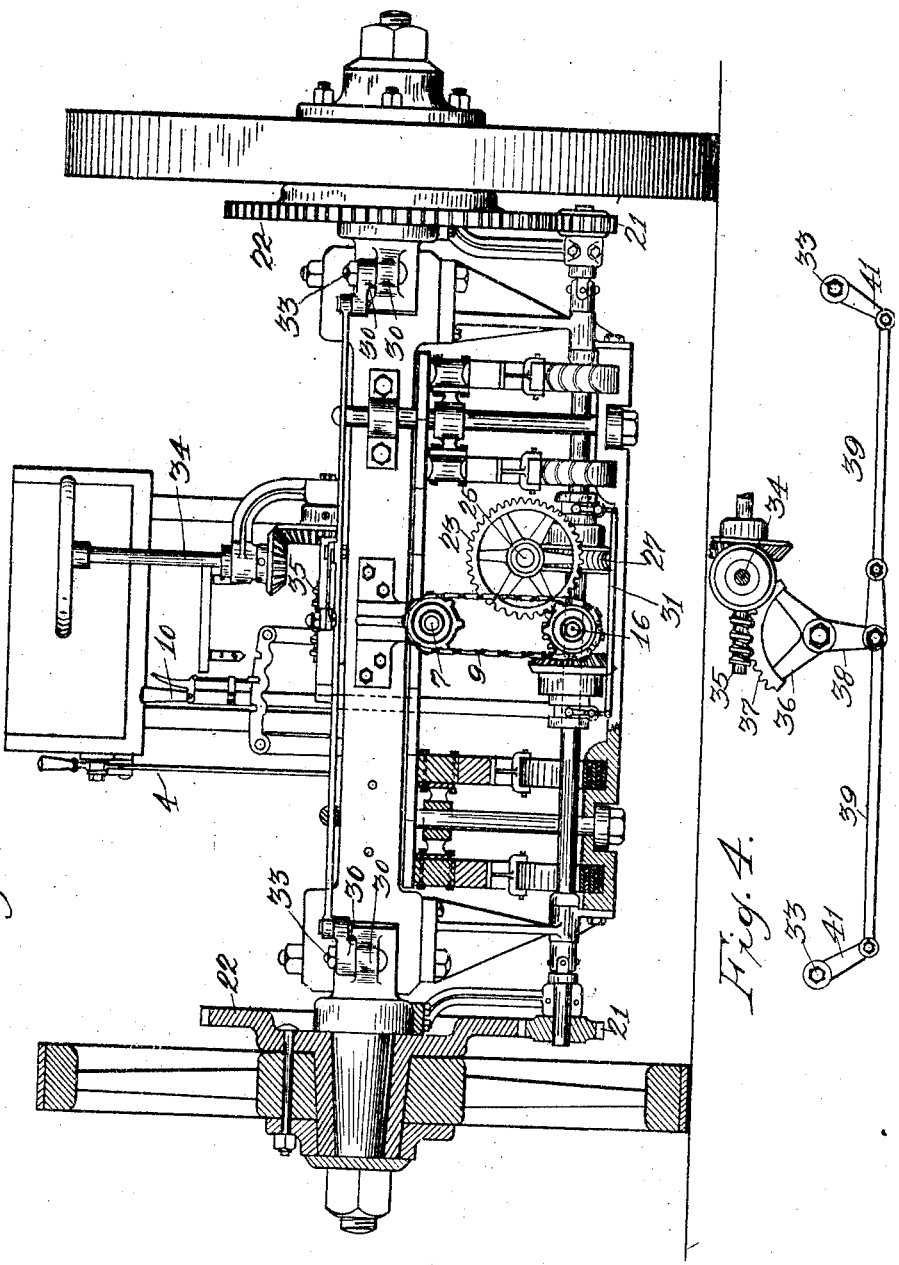

UNITED STATES PATENT OFFICE.

CARLOS SCHMIDT, OF SAN FRANCISCO, CALIFORNIA.

MOTOR-TRUCK.

No. 832,749.  Specification of Letters Patent.  Patented Oct. 9, 1906.

Application filed December 5, 1905. Serial No. 290,421.

*To all whom it may concern:*

Be it known that I, CARLOS SCHMIDT, a citizen of the Republic of Chile, residing at San Francisco, in the county of San Francisco and State of California, have invented certain new and useful Improvements in Motor-Trucks, of which the following is a specification.

My invention relates to motor-trucks, and especially to improvements upon the invention shown in a certain patent granted to me September 5, 1905, and numbered 798,926.

The present improvements relate more especially to the driving of the front and rear wheels, to the use of change-speed gearing in the driving system, and to various details of construction and arrangement, all tending to form an improved truck.

An embodiment of my invention is shown in the accompanying drawings, in which—

Figure 1 is a longitudinal section of the truck on the line 1 1 of Fig. 2. Fig. 2 is a plan view partly broken away. Fig. 3 is a front elevation, also partly broken away. Fig. 4 is a detail view of the steering mechanism.

As in the case of my previous invention, this truck is intended for the transportation of heavy loads and has consequently a strongly-supported platform low hung between large front and rear wheels. The truck is automobile and the propelling power is a motor 1 of any desired character. This motor is located just forward of the platform and is somewhat inclined, as shown in Fig. 1.
The driving-shaft of the motor is connected by clutch mechanism 2 with the shafts which drive the front-wheel and rear-wheel gearing and is controlled through a link 3 by an accessible lever 4 for starting, stopping, and reversing. The rear shaft 5 enters the gear-case 6 and operates a change-speed gear in a manner hereinafter described. The front shaft 7 drives the gearing in the front gear-case 8 through a sprocket-chain 9, which connects said shaft 7 to the driving-shaft 16, which enters the gear-case. Both shafts 5 and 7 are provided with knuckle-joints 5ª 7ª, which prevent any irregularities in the motion of the truck from interfering with the proper transmission of power.

A transverse shaft 20 passes through each gear-case and carries at each end a pinion 21, which drives the large gears 22, secured to the main carrying-wheels. I have in the present case provided both gear-cases with change-speed gearing, so as to enable my truck under different conditions as to loads, grades, character, and condition of roadway, &c., to use either speed or power as desired. Both these change-speed gears are simultaneously controlled by a single lever 10, situated in convenient proximity to the driver's seat. Fig. 3, in connection with Fig. 2, gives a clear illustration of this construction and operation. The shaft 16, which carries the lower forward sprocket-wheel 17, enters the forward gear-case and carries a fixed bevel-pinion 18. This pinion engages another bevel-pinion 19, which is loose on the transverse shaft 20. When the pinion 19 is fixed upon shaft 20, the gear is arranged for speed. For low speed and power the shaft 20 is provided with worm-gearing. The sprocket-wheel shaft 16 has a spur-pinion 24, as best shown in Fig. 2, which engages another spur-pinion 23 on a shaft 25 in the gear-case, which shaft has a worm 26. This worm is in constant engagement with a loose worm 27 on the shaft 20. Two clutches 28 29, fixed upon said shaft 20, are connected by a rod 31, as shown in Fig. 3, and this rod is in turn controlled by the driver's lever 10, so that when one speed is thrown on the other is thrown off. The arrangement in the rear gear-case is substantially the same excepting that no intermediate sprocket connection is employed, since the driving-shaft 5 itself enters the rear gear-case just as the shaft 15 enters the forward gear-case. The same arrangement of bevel and worm gears and of controlling-clutches is employed in the rear gear-case as in the front gear-case. The clutches on the rear transmitting-shaft 20 are controlled from the driver's lever 10 through the longitudinal rod 32.

I have considerably modified and improved the steering apparatus as compared with that shown in my previous patent, in which both front wheels were mounted upon a common axle swiveling upon a king-bolt. In the present case the forward wheels are independently swiveled to the truck-frame by means of the bolts 33 and lugs 30, as best shown in Fig. 3. The latter figure, in connection with Fig. 4, clearly illustrates the steering connections. The hand-wheel shaft 34, through bevel-gearing, drives the worm-shaft 35. The pivoted sector 36 has an intermeshing worm 37 and an arm 38. This arm is jointed to the connecting-rods 39, which are in turn jointed to cranks 41 on the bolts 33. Thus by turning the hand-wheel great power can be applied to the simultaneous swiveling of both front wheels, and they respond more quickly to the steering impulse than two wheels mounted upon a common axle in bogie style.

It will be observed that the motor is entirely forward of the platform and that the rear driving-shaft is entirely below the platform, having the latter free and unobstructed, whereas in my previous patent the motor was mounted upon the platform and the rear driving-shaft was partly above said platform and passed through an opening therein. Other advantages of my device, such as the simultaneous driving by change-speed gearing of both pairs of wheels and the improved steering arrangement, will be noted by those skilled in the art.

I do not limit myself to exact details of construction and arrangement herein described, and shown in the drawings, as I desire to avail myself of such modifications and equivalents as fall properly within the spirit of my invention.

Having thus described my invention, what I claim as new, and desire to secure by Letters Patent, is—

1. In a motor-truck, carrying-wheels, a platform, a motor, independent change-speed gearing for driving the front and rear wheels respectively, and means for simultaneously changing speed in both driving-gearings.

2. In a motor-truck, front and rear carrying-wheels, a motor, change-speed driving-gearing for each pair of wheels comprising a bevel-gearing and a worm-gearing; and means for simultaneously connecting the said gearing at both ends of the truck.

3. In a motor-truck, front and rear carrying-wheels provided with gears, a motor, front and rear gear-cases, transverse shafts passing through said gear-cases, and carrying pinions engaging with the gears on the carrying-wheels, a bevel-gear and a worm-gear loose upon each of said transverse shafts, a driving-shaft entering each gear-case, and having bevel-gear and worm-gear connections with said loose gears, clutches for securing either loose gear to the shaft upon which it is mounted, and a single lever having connections to all of said clutches whereby the change of speed is simultaneously accomplished in both gear-cases.

In testimony whereof I have affixed my signature, in presence of two witnesses, this 22d day of November, 1905.

CARLOS SCHMIDT.

Witnesses:
M. R. SEELY,
F. M. BARTEL.